United States Patent
Herbst et al.

(10) Patent No.: US 10,193,372 B2
(45) Date of Patent: Jan. 29, 2019

(54) OPERATING AN INDUCTIVE ENERGY TRANSFER SYSTEM

(71) Applicant: Apple Inc., Cupertino, CA (US)

(72) Inventors: Steven G. Herbst, Cupertino, CA (US); Scott D. Morrison, Cupertino, CA (US); Jeffrey M. Alves, Cupertino, CA (US); Brandon R. Garbus, Cupertino, CA (US); Jim C. Hwang, Cupertino, CA (US); Robert S. Parnell, Cupertino, CA (US); Terry L. Tikalsky, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 775 days.

(21) Appl. No.: 14/795,723

(22) Filed: Jul. 9, 2015

(65) Prior Publication Data

US 2016/0064992 A1 Mar. 3, 2016

Related U.S. Application Data

(60) Provisional application No. 62/044,967, filed on Sep. 2, 2014.

(51) Int. Cl.
*H02J 7/02* (2016.01)
*H02J 5/00* (2016.01)
(Continued)

(52) U.S. Cl.
CPC ............. *H02J 7/025* (2013.01); *H02J 5/005* (2013.01); *H02J 50/10* (2016.02); *H02J 50/80* (2016.02)

(58) Field of Classification Search
CPC ..................................................... H02J 50/80
(Continued)

(56) References Cited

U.S. PATENT DOCUMENTS

| 4,268,899 A | 5/1981 | Rokas |
| 5,293,308 A | 3/1994 | Boys et al. |

(Continued)

FOREIGN PATENT DOCUMENTS

| CN | 1826715 | 8/2006 |
| CN | 101243374 | 8/2006 |

(Continued)

OTHER PUBLICATIONS

U.S. Appl. No. 15/626,930, filed Jun. 19, 2017, Moyer et al.
(Continued)

*Primary Examiner* — Adi Amrany
(74) *Attorney, Agent, or Firm* — Brownstein Hyatt Farber Schreck, LLP

(57) ABSTRACT

A receiver device in an inductive energy transfer system can include a touch sensing device. If the input surface of the touch sensing device is touched, a transmitter device can periodically stop transferring energy to allow the touch sensing device to sense touch samples while inductive energy transfer is inactive. Additionally or alternatively, a transmitter device can produce an averaged duty cycle by transferring energy to the receiver device for one or more periods at a first duty cycle step and for one or more periods at different second first duty cycle step. Additionally or alternatively, a transmitter device can reduce a current level received by a DC-to-AC converter if the current received by the DC-to-AC converter equals or exceeds a threshold. Additionally or alternatively, a transmitter device can ping a receiver device and transfer energy only after a response signal is received from the receiver device.

18 Claims, 12 Drawing Sheets

(51) Int. Cl.
  *H02J 50/10* (2016.01)
  *H02J 50/80* (2016.01)

(58) Field of Classification Search
  USPC .......................................................... 307/104
  See application file for complete search history.

(56) References Cited

U.S. PATENT DOCUMENTS

| | | |
|---|---|---|
| 5,479,486 A | 12/1995 | Saji |
| 5,639,989 A | 6/1997 | Higgins, III |
| 6,198,260 B1 | 3/2001 | Wittenbreder |
| 6,960,968 B2 | 11/2005 | Odenaal et al. |
| 6,972,543 B1 | 12/2005 | Wells |
| 7,339,558 B2 | 3/2008 | Chen et al. |
| 7,641,358 B1 | 1/2010 | Smith et al. |
| 7,893,564 B2 | 2/2011 | Bennett |
| 7,948,208 B2 | 5/2011 | Partovi et al. |
| 7,952,322 B2 | 5/2011 | Partovi et al. |
| 8,024,491 B1 | 9/2011 | Wright et al. |
| 8,054,651 B2 | 11/2011 | Pollard |
| 8,134,416 B2 | 3/2012 | Moiraghi et al. |
| 8,169,151 B2 | 5/2012 | Kimura |
| 8,169,185 B2 | 5/2012 | Partovi et al. |
| 8,274,178 B2 | 9/2012 | Tucker |
| 8,278,784 B2 | 10/2012 | Cook |
| 8,329,376 B2 | 11/2012 | Kitamura et al. |
| 8,332,547 B2 | 12/2012 | Sugaya |
| 8,362,744 B2 | 1/2013 | Terao et al. |
| 8,421,274 B2 | 4/2013 | Sun et al. |
| 8,629,652 B2 | 1/2014 | Partovi et al. |
| 8,629,654 B2 | 1/2014 | Partovi et al. |
| 8,663,106 B2 | 3/2014 | Stivoric |
| 8,716,974 B2 | 5/2014 | Sakoda et al. |
| 8,742,625 B2 | 6/2014 | Baarman et al. |
| 8,810,071 B2 | 8/2014 | Sauerlaender et al. |
| 8,853,892 B2 | 10/2014 | Fells et al. |
| 8,884,469 B2 | 11/2014 | Lemmens |
| 8,890,470 B2 | 11/2014 | Partovi et al. |
| 8,896,264 B2 | 11/2014 | Partovi |
| 8,901,881 B2 | 12/2014 | Partovi et al. |
| 8,922,525 B2 | 12/2014 | Chen et al. |
| 8,947,047 B2 | 2/2015 | Partovi et al. |
| 9,018,904 B2 | 4/2015 | Seyerle et al. |
| 9,030,421 B2 | 5/2015 | Tseng et al. |
| 9,041,346 B2 | 5/2015 | Nakama |
| 9,093,857 B2 | 7/2015 | Sakai et al. |
| 9,099,867 B2 | 8/2015 | Park |
| 9,099,885 B2 | 8/2015 | Kamata |
| 9,106,083 B2 | 8/2015 | Partovi |
| 9,112,362 B2 | 8/2015 | Partovi |
| 9,112,363 B2 | 8/2015 | Partovi |
| 9,112,364 B2 | 8/2015 | Partovi |
| 9,124,112 B2 | 9/2015 | Havass et al. |
| 9,126,490 B2 | 9/2015 | Cook |
| 9,148,201 B2 | 9/2015 | Kallal et al. |
| 9,154,189 B2 | 10/2015 | Von Novak et al. |
| 9,160,180 B2 | 10/2015 | Suzuki et al. |
| 9,178,369 B2 | 11/2015 | Partovi |
| 9,197,065 B2 | 11/2015 | Divan et al. |
| 9,197,070 B2 | 11/2015 | Jung |
| 9,197,082 B1 | 11/2015 | Zhang |
| 9,231,411 B2 | 1/2016 | Baarman et al. |
| 9,270,138 B2 | 2/2016 | Yamakawa et al. |
| 9,276,437 B2 | 3/2016 | Partovi et al. |
| 9,318,915 B2 | 4/2016 | Miller et al. |
| 9,325,200 B2 | 4/2016 | Nishiwaki |
| 9,352,661 B2 | 5/2016 | Keeling et al. |
| 9,356,659 B2 | 5/2016 | Partovi |
| 9,407,107 B2 | 8/2016 | Park et al. |
| 9,460,846 B2 | 10/2016 | Graham et al. |
| 9,461,502 B2 | 10/2016 | Lee |
| 9,496,731 B2 | 11/2016 | Park et al. |
| 9,515,514 B2 | 12/2016 | Lee et al. |
| 9,531,300 B2 | 12/2016 | Harrison et al. |
| 9,537,363 B2 | 1/2017 | Bossetti et al. |
| 9,564,776 B2 | 2/2017 | Lampinen |
| 9,685,802 B1 | 6/2017 | Mirov |
| 9,716,433 B2 | 7/2017 | Coleman et al. |
| 9,754,717 B2 | 9/2017 | Long et al. |
| 9,793,761 B2 | 10/2017 | Sampei et al. |
| 9,800,076 B2 | 10/2017 | Jadidian et al. |
| 9,813,041 B1 | 11/2017 | Ritter |
| 9,831,787 B1 | 11/2017 | Halberstadt |
| 9,958,904 B2 | 5/2018 | Von Badinski et al. |
| 10,027,130 B2 | 7/2018 | Cho et al. |
| 10,027,185 B2* | 7/2018 | Moyer ............... H02J 50/70 |
| 10,116,169 B2 | 10/2018 | Cho et al. |
| 2001/0044588 A1 | 11/2001 | Mault |
| 2008/0284609 A1 | 11/2008 | Rofougaran |
| 2009/0146608 A1 | 6/2009 | Lee |
| 2010/0201315 A1 | 8/2010 | Oshimi et al. |
| 2010/0328044 A1 | 12/2010 | Waffenschmidt et al. |
| 2011/0050164 A1 | 3/2011 | Partovi et al. |
| 2011/0109264 A1 | 5/2011 | Choi |
| 2011/0136550 A1 | 6/2011 | Maugars |
| 2011/0198937 A1 | 8/2011 | Tseng |
| 2011/0221385 A1 | 9/2011 | Partovi |
| 2011/0221387 A1 | 9/2011 | Steigerwald et al. |
| 2011/0234012 A1 | 9/2011 | Yi et al. |
| 2011/0241615 A1 | 10/2011 | Yeh |
| 2011/0254379 A1 | 10/2011 | Madawala |
| 2011/0302078 A1 | 12/2011 | Failing |
| 2012/0068550 A1 | 3/2012 | De Boer et al. |
| 2012/0169139 A1 | 7/2012 | Kudo |
| 2012/0249449 A1* | 10/2012 | Tseng ............... G06F 3/0418 |
| | | 345/173 |
| 2012/0255039 A1 | 10/2012 | Sipes |
| 2012/0313577 A1 | 12/2012 | Moes et al. |
| 2013/0063160 A1 | 3/2013 | Nakano et al. |
| 2013/0076648 A1 | 3/2013 | Krah et al. |
| 2013/0093388 A1 | 4/2013 | Partovi |
| 2013/0147720 A1* | 6/2013 | Yilmaz ............... G06F 1/1635 |
| | | 345/173 |
| 2013/0099563 A1 | 9/2013 | Partovi et al. |
| 2013/0257168 A1 | 10/2013 | Singh |
| 2013/0260677 A1 | 10/2013 | Partovi |
| 2013/0271069 A1 | 10/2013 | Partovi |
| 2013/0285604 A1 | 10/2013 | Partovi |
| 2013/0285605 A1 | 10/2013 | Partovi |
| 2013/0300204 A1 | 11/2013 | Partovi |
| 2013/0334326 A1 | 12/2013 | Shan |
| 2014/0015327 A1 | 1/2014 | Keeling et al. |
| 2014/0015522 A1 | 1/2014 | Widmer et al. |
| 2014/0035378 A1 | 2/2014 | Kesler et al. |
| 2014/0103873 A1 | 4/2014 | Partovi et al. |
| 2014/0129010 A1 | 5/2014 | Garg |
| 2014/0132210 A1 | 5/2014 | Partovi |
| 2014/0159501 A1 | 6/2014 | Kanno et al. |
| 2014/0159656 A1 | 6/2014 | Riehl |
| 2014/0191568 A1 | 7/2014 | Partovi |
| 2014/0191818 A1 | 7/2014 | Waffenschmidt et al. |
| 2014/0197687 A1 | 7/2014 | Lin |
| 2014/0197782 A1 | 7/2014 | Graf et al. |
| 2014/0225439 A1 | 8/2014 | Mao |
| 2014/0266018 A1 | 9/2014 | Carobolante |
| 2014/0306654 A1 | 10/2014 | Partovi |
| 2014/0347007 A1 | 11/2014 | Kee et al. |
| 2015/0001950 A1 | 1/2015 | Chung et al. |
| 2015/0022194 A1 | 1/2015 | Almalki |
| 2015/0035372 A1 | 2/2015 | Aioanei |
| 2015/0077045 A1 | 3/2015 | Harris |
| 2015/0280455 A1 | 3/2015 | Bosshard et al. |
| 2015/0130412 A1 | 5/2015 | Partovi |
| 2015/0207333 A1 | 7/2015 | Baarman et al. |
| 2015/0214750 A1 | 7/2015 | Moshkovich et al. |
| 2015/0215006 A1 | 7/2015 | Mehas et al. |
| 2015/0244179 A1 | 8/2015 | Ritter et al. |
| 2015/0244341 A1 | 8/2015 | Ritter et al. |
| 2015/0270058 A1 | 9/2015 | Golko et al. |
| 2015/0333530 A1 | 11/2015 | Moyer et al. |
| 2015/0349538 A1 | 12/2015 | Agostinelli et al. |
| 2015/0349539 A1* | 12/2015 | Moyer ............... H02J 5/005 |
| | | 307/104 |
| 2015/0364931 A1 | 12/2015 | Ren et al. |

(56) References Cited

U.S. PATENT DOCUMENTS

| | | | |
|---|---|---|---|
| 2015/0370410 A1* | 12/2015 | Sauer | G06F 3/0418 345/173 |
| 2016/0043567 A1 | 2/2016 | Matumoto et al. | |
| 2016/0049796 A1 | 2/2016 | Cho et al. | |
| 2016/0056664 A1 | 2/2016 | Partovi | |
| 2016/0064948 A1 | 3/2016 | Heresztyn et al. | |
| 2016/0072306 A1 | 3/2016 | Tsuda | |
| 2016/0127672 A1 | 5/2016 | Kamide et al. | |
| 2016/0172894 A1 | 6/2016 | Khripkov et al. | |
| 2016/0181849 A1 | 6/2016 | Govindaraj | |
| 2016/0261137 A1 | 9/2016 | Riehl | |
| 2016/0285278 A1 | 9/2016 | Mehas et al. | |
| 2017/0012463 A1 | 1/2017 | Lynch | |
| 2017/0089959 A1 | 3/2017 | Ito et al. | |
| 2017/0110911 A1 | 4/2017 | Bossetti et al. | |
| 2017/0222493 A1 | 8/2017 | Oki et al. | |
| 2018/0013312 A1 | 1/2018 | Moyer et al. | |
| 2018/0062443 A1 | 3/2018 | Cho et al. | |
| 2018/0233955 A1 | 8/2018 | Park et al. | |

FOREIGN PATENT DOCUMENTS

| | | |
|---|---|---|
| CN | 101232190 | 7/2008 |
| CN | 101777801 | 7/2010 |
| CN | 101814757 | 8/2010 |
| CN | 102055250 | 5/2011 |
| CN | 102113195 | 6/2011 |
| CN | 102124624 | 7/2011 |
| CN | 102257696 | 11/2011 |
| CN | 102355035 | 2/2012 |
| CN | 102396132 | 3/2012 |
| CN | 202712982 | 1/2013 |
| CN | 102998711 | 3/2013 |
| CN | 103019485 | 4/2013 |
| CN | 202976038 | 6/2013 |
| CN | 103248132 | 8/2013 |
| CN | 103269092 | 8/2013 |
| CN | 103324333 | 9/2013 |
| CN | 103326475 | 9/2013 |
| CN | 103457362 | 12/2013 |
| CN | 103518175 | 1/2014 |
| CN | 103545893 | 1/2014 |
| CN | 103597711 | 2/2014 |
| CN | 103765722 | 4/2014 |
| CN | 103812162 | 5/2014 |
| CN | 103999320 | 8/2014 |
| CN | 104037750 | 9/2014 |
| EP | 1633122 | 8/2005 |
| EP | 2642628 | 9/2013 |
| GB | 2484999 | 5/2012 |
| JP | H06311658 | 4/1994 |
| JP | H06268565 | 9/1994 |
| JP | H08149608 | 6/1996 |
| JP | H08331850 | 12/1996 |
| JP | H10173741 | 6/1998 |
| JP | 2001069388 | 3/2001 |
| JP | 2001333551 | 11/2001 |
| JP | 2010161882 | 7/2010 |
| JP | 2010268531 | 11/2010 |
| JP | 2011120443 | 6/2011 |
| JP | 2011259612 | 12/2011 |
| JP | 2012503959 | 2/2012 |
| JP | 2013115929 | 6/2013 |
| JP | 2013183497 | 9/2013 |
| JP | 2013536664 | 9/2013 |
| JP | 2014023281 | 3/2014 |
| JP | 2014193087 | 10/2014 |
| KR | 20130055199 | 5/2013 |
| KR | 20140061337 | 5/2014 |
| WO | WO 09/045847 | 4/2009 |
| WO | WO 10/077991 | 7/2010 |
| WO | WO 10/108191 | 9/2010 |
| WO | WO 11/156555 | 12/2011 |
| WO | WO 12/085119 | 6/2012 |
| WO | WO 13/011905 | 1/2013 |
| WO | WO 13/122625 | 8/2013 |
| WO | WO 14/034966 | 3/2014 |
| WO | WO 15/102113 | 7/2015 |
| WO | WO 16/024869 | 2/2016 |

OTHER PUBLICATIONS

U.S. Appl. No. 15/829,610, filed Dec. 1, 2017, Qiu et al.
U.S. Appl. No. 15/829,850, filed Dec. 1, 2017, Qiu et al.
U.S. Appl. No. 15/393,435, filed Dec. 29, 2016, Bossetti et al.
U.S. Appl. No. 15/467,998, filed Mar. 23, 2017, Bentov et al.
U.S. Appl. No. 15/468,001, filed Mar. 23, 2017, Qiu et al.
U.S. Appl. No. 15/179,922, filed Jun. 10, 2016, Lynch.
European Search Report dated Feb. 9, 2016, EP 15183554.3, 8 pages.
Office Action dated Nov. 18, 2015, CN 201520670740.6, 5 pages.
Office Action dated Feb. 24, 2016, CN 201520670740.6, 2 pages.
European Search Report dated Jun. 3, 2016, EP 15183554.3, 11 pages.
U.S. Appl. No. 14/628,897, filed Feb. 23, 2015, Ritter et al.
U.S. Appl. No. 14/627,957, filed Feb. 20, 2015, Ritter et al.
U.S. Appl. No. 14/837,965, filed Aug. 27, 2015, Heresztyn et al.

\* cited by examiner

US 10,193,372 B2

OPERATING AN INDUCTIVE ENERGY TRANSFER SYSTEM

CROSS-REFERENCE TO RELATED APPLICATION(S)

This application claims the benefit under 35 U.S.C. § 119(e) of U.S. Provisional Patent Application No. 62/044,967, filed Sep. 2, 2014, entitled "Operating an Inductive Energy Transfer System," the entirety of which is incorporated herein by reference as if fully disclosed herein.

FIELD

The invention relates generally to inductive energy transfer systems.

BACKGROUND

Many electronic devices include one or more rechargeable batteries that require external power to recharge from time to time. Often, these devices may be charged using a similar power cord or connector, for example a universal serial bus ("USB") connector. However, despite having common connection types, devices often require separate power supplies with different power outputs. These multiple power supplies can be burdensome to use, store, and transport from place to place. As a result, the benefits of device portability may be substantially limited.

Furthermore, charging cords may be unsafe to use in certain circumstances. For example, a driver of a vehicle may become distracted attempting to plug an electronic device into a vehicle charger. In another example, a charging cord may present a tripping hazard if left unattended.

To account for these and other shortcomings of portable electronic devices, some devices include an inductive charging device. The user may simply place the electronic device on a charging surface of the inductive charging device to transfer energy from the charging device to the electronic device. The charging device transfers energy to the electronic device through inductively coupling between a transmitter coil in the charging device and a receiver coil in the electronic device. Unfortunately, inductive charging can be adversely affected by power losses, which reduce the efficiency of the energy transfer. The conversion of energy into heat during the energy transfer process contributes to the power losses.

Additionally, the performance of other devices or functions in the electronic device may be adversely impacted while energy is transferring inductively from the charging device to the electronic device. As one example, an electronic device can include a touch sensing device. During inductive energy transfer, the touch sensing device may not be able to detect a touch on an input surface because the amount of noise transferred to the electronic device during the inductive energy transfer may overwhelm the signal used to determine or sense touch.

SUMMARY

In one aspect, a receiver device in an inductive energy transfer system can include a touch sensing device. A method for operating the inductive energy transfer system may include detecting if an input surface of the touch sensing device is touched while the transmitter device is transferring energy inductively to the receiver device. If the input surface is touched, the transmitter device can transfer energy inductively only during a first time period and the touch sensing device may obtain touch samples only during a different second time period. Essentially, inductive energy transfer is periodically turned off to allow the touch sensing device to sense touch samples while the inductive energy transfer is turned off.

In one example embodiment, the receiver device can transmit a signal to the transmitter device when the input surface is touched by a user's finger or object (e.g., a conductive stylus). Based on the signal, the transmitter device turns off for a given period of time. While the transmitter device is turned off, the touch sensing device obtains one or more touch samples. At the end of the given time period, the transmitter device turns on and transfers energy inductively to the receiver device.

In another aspect, a method for operating an inductive energy transfer system that includes a transmitter device and a receiver device can include the transmitter device transferring energy inductively to the receiver device for one or more periods at a first duty cycle step, and the transmitter device transferring energy inductively to the receiver device for one or more periods at different second first duty cycle step. The method produces a given duty cycle modulation pattern that averages the duty cycle over a given number of periods.

In yet another aspect, a method for operating an inductive energy transfer system can include a current sense circuit sensing a current input into a DC-to-AC converter in the transmitter device during inductive energy transfer from the transmitter device to the receiver device. A processing device may determine if the sensed current exceeds a threshold. If the sensed current exceeds the threshold, an operating condition of the DC-to-AC converter is modified to reduce the amount of current that is drawn by the DC-to-AC converter. In one embodiment, a signal level that is received by the DC-to-AC converter can be reduced by a given amount. As one example, a duty cycle of the energy transfer is decreased by a given amount. As another example, a voltage level input into the AC-to-Dc converter is reduced by a given amount. In other embodiments, an operating frequency of the DC-to-AC converter may be altered by a given amount.

In another aspect, a method for operating an inductive energy transfer system that includes a transmitter device and a receiver device can include the transmitter device transmitting a ping during a first time period, and within a given time period after the first time period, the transmitter device detects the receiver device is transmitting a signal. The transmitter device may then extend the given time period, and the transmitter device can determine if it receives a complete signal from the receiver device. If the transmitter device receives a complete signal, the transmitter device can transfer energy to the receiver device based on the receipt of the complete signal. In one embodiment, the signal can be implemented as a preamble packet that is included in a communication protocol.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Embodiments described herein provide various techniques for operating an inductive energy transfer system. The techniques may be used individually or in various suitable combinations. As used herein, the terms "energy", "signal", or "signals" are meant to encompass transferring energy for wireless charging, transferring energy as communication and/or control signals, or both wireless charging and the transmission of communication and/or control signals.

Figure 1:
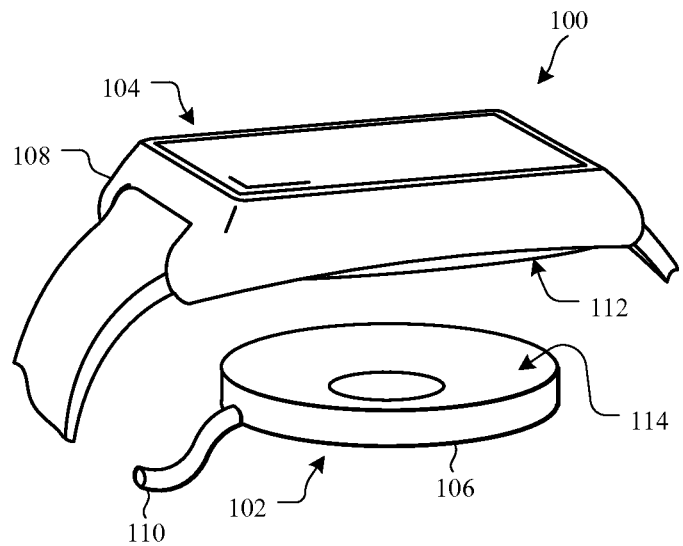
FIG. 1 shows one example of an inductive energy transfer system in an unmated configuration.

FIG. 1 shows a perspective view of one example of an inductive energy transfer system in an unmated configuration. The illustrated embodiment depicts a transmitter device 102 that is configured to wirelessly transfer energy to a receiver device 104. The receiver device 104 can be any electronic device that includes one or more inductors. Example electronic devices include, but are not limited to, portable electronic devices such as a wearable communication device and a smart telephone.

The wearable communication device, such as the one depicted in FIG. 1, may be configured to provide, for example, wireless electronic communication from other devices and/or health-related information or data to a user and/or to an associated device. As one example, the health-related information can include, but is not limited to, heart rate data, blood pressure data, temperature data, oxygen level data, diet/nutrition information, medical reminders, health-related tips or information, or other health-related data. The associated device may be, for example, a tablet computing device, a smart telephone, a personal digital assistant, a computer, and so on.

A wearable communication device may include a strap or band to connect the wearable communication device to a user. For example, a smart watch may include a band or strap to secure to a user's wrist. In another example, a wearable communication device may include a strap to connect around a user's chest, or alternately, a wearable communication device may be adapted for use with a lanyard or necklace. In still further examples, a wearable communication device may secure to or within another part of a user's body. In these and other embodiments, the strap, band, lanyard, or other securing mechanism may include one or more electronic components or sensors in wireless or wired communication with the accessory. For example, the band secured to a smart watch may include one or more sensors, an auxiliary battery, a camera, or any other suitable electronic component.

In many examples, a wearable communication device, such as the one depicted in FIG. 1, may include a processing device coupled with, or in communication with a memory, one or more communication interfaces, output devices such as displays and speakers, one or more sensors, such as biometric and imaging sensors, and input devices such as one or more buttons, one or more dials, a microphone, and/or a touch sensing device. The communication interface(s) can provide electronic communications between the communications device and any external communication network, device or platform, such as but not limited to wireless interfaces, Bluetooth interfaces, Near Field Communication interfaces, infrared interfaces, USB interfaces, Wi-Fi interfaces, TCP/IP interfaces, network communications interfaces, or any conventional communication interfaces. The wearable communication device may provide information regarding time, health, statuses or externally connected or communicating devices and/or software executing on such devices, messages, video, operating commands, and so forth (and may receive any of the foregoing from an external device), in addition to communications.

Figure 2:
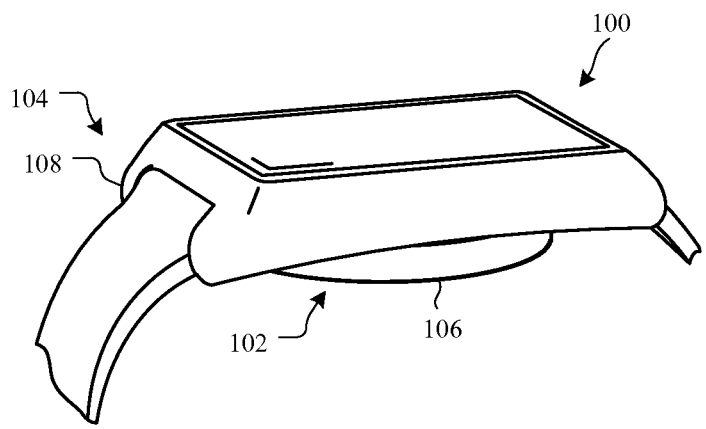
FIG. 2 shows the inductive energy transfer system 100 in a mated configuration.

Although the wearable communication device illustrated in FIGS. 1 and 2 depicts a wristwatch or smart watch, any electronic device may be suitable to receive energy inductively from a transmitter device. For example, a suitable electronic device may be any portable or semi-portable electronic device that may receive energy inductively ("receiver device"), and a suitable dock device may be any portable or semi-portable docking station or charging device that may transmit energy inductively ("transmitter device").

The transmitter device 102 and the receiver device 104 may each respectively include a housing 106, 108 to enclose electronic, mechanical and structural components therein. In many examples, and as depicted, the receiver device 104 may have a larger lateral cross section than that of the transmitter device 102, although such a configuration is not required. In other examples, the transmitter device 102 may have a larger lateral cross section than that of the receiver device 104. In still further examples, the cross sections may be substantially the same. And in other embodiments, the transmitter device can be adapted to be inserted into a charging port in the receiver device.

In the illustrated embodiment, the transmitter device 102 may be connected to a power source by cord or connector 110. For example, the transmitter device 102 can receive power from a wall outlet, or from another electronic device through a connector, such as a USB connector. Additionally or alternatively, the transmitter device 102 may be battery operated. Similarly, although the illustrated embodiment is shown with the connector 110 coupled to the housing of the transmitter device 102, the connector 110 may be connected by any suitable means. For example, the connector 110 may be removable and may include a connector that is sized to fit within an aperture or receptacle opened within the housing 106 of the transmitter device 102.

The receiver device 104 may include a first interface surface 112 that may interface with, align or otherwise contact a second interface surface 114 of the transmitter device 102. In this manner, the receiver device 104 and the transmitter device 102 may be positionable with respect to each other. In certain embodiments, the second interface surface 114 of the transmitter device 102 may be configured in a particular shape that mates with a complementary shape of the receiver device 104 (see FIG. 2). The illustrative second interface surface 114 may include a concave shape that follows a selected curve. The first interface surface 112 of the receiver device 104 may include a convex shape following the same or substantially similar curve as the second interface surface 114.

In other embodiments, the first and second interface surfaces 112, 114 can have any given shape and dimension. For example, the first and second interface surfaces 112, 114 may be substantially flat. Additionally or alternatively, the transmitter and receiver devices 102, 104 can be positioned with respect to each other using one or more alignment mechanisms. As one example, one or more magnetic devices may be included in the transmitter and/or receiver devices and used to align the transmitter and receiver devices. In another example, one or more actuators in the transmitter and/or receiver devices can be used to align the transmitter and receiver devices. And in yet another example, alignment features, such as protrusions and corresponding indentations in the housings and/or interface surfaces of the transmitter and receiver devices, may be used to align the transmitter and receiver devices. The design or configuration of the interface surfaces, one or more alignment mechanisms, and one or more alignment features can be used individually or in various combinations thereof.

Figure 3:
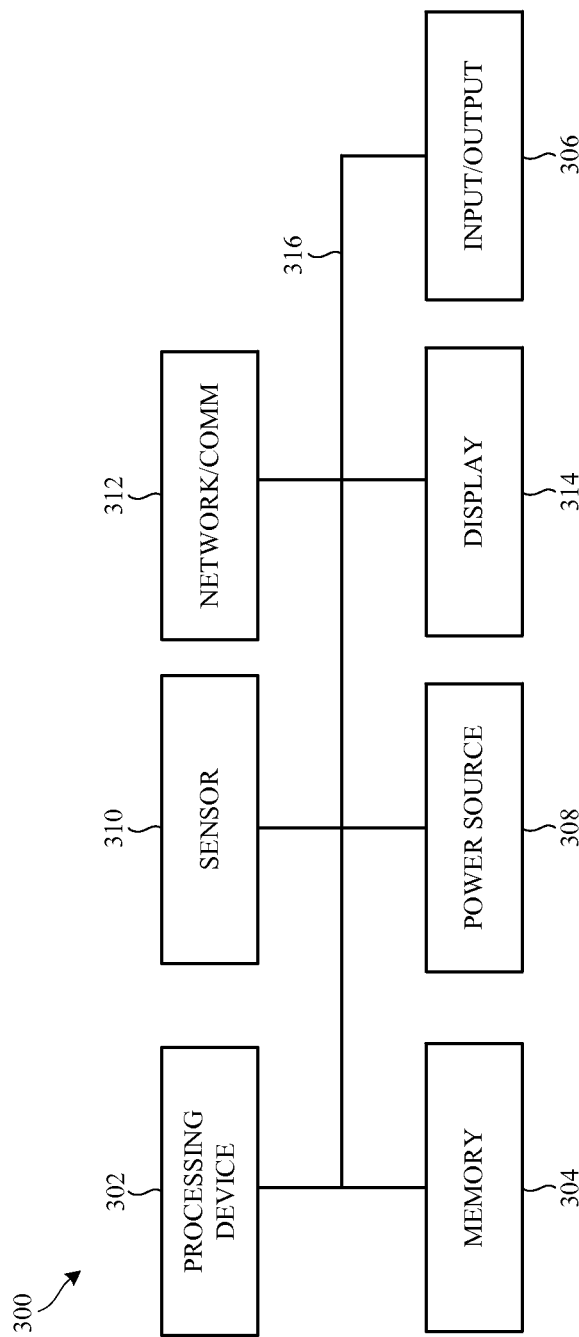
FIG. 3 shows a simplified block diagram of an example electronic device that is suitable for use as a receiver device or a transmitter device.

The transmitter device and the receiver device can each include a number of internal components. FIG. 3 shows a simplified block diagram of an example electronic device that is suitable for use as a receiver device or a transmitter device. The electronic device 300 can include one or more processing devices 302, memory 304, one or more input/output devices 306, a power source 308, one or more sensors 310, a network/communication interface 312, and a display 314, each of which will be discussed in turn below.

The one or more processors 302 can control some or all of the operations of the electronic device 300. The processing device(s) 302 can communicate, either directly or indirectly, with substantially all of the components of the device. For example, one or more system buses 316 or other communication mechanisms can provide communication between the processing device(s) 302, the memory 304, input/output device(s) 306, a power source 308, one or more sensors 310, a network/communication interface 312, and a display 314. The processing device(s) 302 can be implemented as any electronic device capable of processing, receiving, or transmitting data or instructions. For example, the one or more processing devices 302 can be a microprocessor, a central processing unit (CPU), an application-specific integrated circuit (ASIC), a digital signal processor (DSP), or combinations of multiple such devices. As described herein, the term "processing device" is meant to encompass a single processor or processing unit, multiple processors, multiple processing units, or other suitably configured computing element or elements.

The memory 304 can store electronic data that can be used by the electronic device 300. For example, the memory 304 can store electrical data or content such as audio files, document files, timing and control signals, and image data. The memory 304 can be configured as any type of memory. By way of example only, memory 304 can be implemented as random access memory, read-only memory, Flash memory, removable memory, or other types of storage elements, in any combination.

The one or more I/O devices 306 can transmit and/or receive data to and from a user or another electronic device. Example I/O device(s) 306 include, but are not limited to, a touch sensing input device such as a touchscreen or track pad, one or more buttons, a microphone, and/or a speaker.

The power source 308 can be implemented with any device capable of providing energy to the electronic device 300. For example, the power source 308 can be one or more batteries or rechargeable batteries, or a connection cable that connects the electronic device to another power source such as a wall outlet.

The electronic device 300 may also include one or more sensors 310 positioned substantially anywhere on or in the electronic device 300. The sensor or sensors 310 may be configured to sense substantially any type of characteristic, such as but not limited to, images, pressure, light, touch, temperature, heat, movement, relative motion, biometric data, and so on. For example, the sensor(s) 310 may be an image sensor, a temperature sensor, a light or optical sensor, an accelerometer, a gyroscope, a magnet, a health monitoring sensor, and so on.

The network communication interface 312 can facilitate transmission of data to or from other electronic devices. For example, a network communication interface can transmit electronic signals via a wireless and/or wired network connection. For example, in one embodiment a communication signal is transmitted to a transmitter device and/or to a receiver device to permit the transmitter and receiver devices to communication with one another. Examples of wireless and wired network connections include, but are not limited to, cellular, Wi-Fi, Bluetooth, infrared (IR), Ethernet, and Near Field Communication (NFC).

The display 314 can provide a visual output to the user. The display 314 can be implemented with any suitable technology, including, but not limited to, a multi-touch sensing touchscreen that uses liquid crystal display (LCD) technology, light emitting diode (LED) technology, organic light-emitting display (OLED) technology, organic electroluminescence (OEL) technology, or another type of display technology. In some embodiments, the display 314 can function as an input device that allows the user to interact with the electronic device 300. For example, the display can be a multi-touch touchscreen display.

It should be noted that FIG. 3 is exemplary only. In other examples, the electronic device may include fewer or more components than those shown in FIG. 3. Additionally or alternatively, the electronic device can be included in a system and one or more components shown in FIG. 3 is separate from the electronic device but in communication with the electronic device. For example, an electronic device may be operatively connected to, or in communication with a separate display. As another example, one or more applications or data can be stored in a memory separate from the electronic device. As another example, a processing device in communication with the electronic device can control various functions in the electronic device and/or process data received from the electronic device. In some embodiments, the separate memory and/or processing device can be in a cloud-based system or in an associated device.

Figure 4:
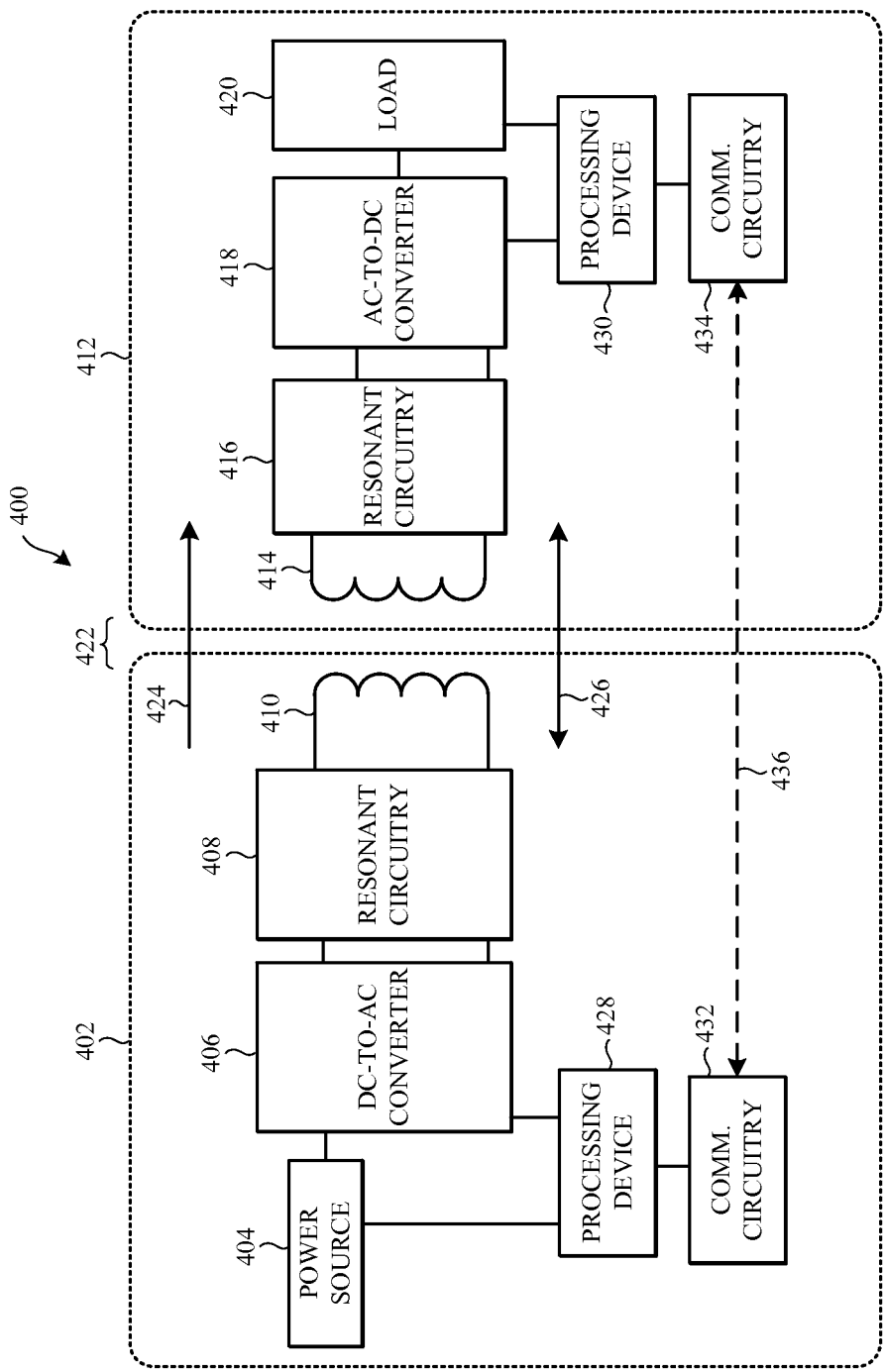
FIG. 4 shows a simplified schematic diagram of a first example of an inductive energy transfer system that is suitable for use as the inductive energy transfer system shown in FIGS. 1 and 2.

FIG. 4 shows a simplified schematic diagram of a first example of an inductive energy transfer system that is suitable for use as the inductive energy transfer system shown in FIGS. 1 and 2. The transmitter device 402 includes a power source 404 operably connected to a DC-to-AC converter 406. As described earlier, an example power source includes, but is not limited to, a wall outlet or another electronic device that is connected to the transmitter device 402 by a connector or cord (see 110 in FIG. 1). Additionally or alternatively, the power source 404 may be one or more batteries.

Any suitable type of a DC-to-AC converter may be used in the transmitter device 402. For example, the DC-to-AC converter can be constructed as an H bridge in one embodiment. The DC-to-AC converter 406 is operatively connected to transmitter resonant circuitry 408. The transmitter resonant circuitry 408 is operatively connected to a transmitter coil 410.

The receiver device 412 can include a receiver coil 414 operably connected to receiver resonant circuitry 416. The receiver resonant circuitry 416 is operatively connected to an AC-to-DC converter 418. Any suitable type of AC-to-DC converter may be used. For example, the AC-to-DC converter can be constructed as a diode bridge in one embodiment.

A load 420 is operably connected to the output of the AC-to-DC converter 418. The load 420 is a rechargeable battery in one embodiment. Other embodiments can use a different type of load.

The transmitter coil 410 and the receiver coil 414 together form a transformer 422. The transformer 422 transfers power or energy through inductive coupling between the transmitter coil 410 and the receiver coil 414 (energy transfer represented by arrow 424). Essentially, energy is transferred from the transmitter coil 410 to the receiver coil 414 through the creation of a varying magnetic flux by an AC signal flowing through the transmitter coil 410. The varying magnetic flux induces a current in the receiver coil 414. The AC signal induced in the receiver coil 414 is received by the AC-to-DC converter 418 that converts the AC signal into a DC signal. In embodiments where the load 420 is a rechargeable battery, the DC signal is used to charge the battery. Additionally or alternatively, the transferred energy can be used to transmit communication signals to or from the receiver device (communication signals represented by arrow 426).

A processing device 428 in the transmitter device 402 can be operatively connected to the power source 404 and/or to the DC-to-AC converter 406. Although not shown in FIG. 4, the processing device 428 may be operatively connected to other components (e.g., display, sensor, memory) in the transmitter device. The processing device 428 may control or monitor the power produced by the power source 404. Additionally or alternatively, the processing device 428 can control or monitor the operation of the DC-to-AC converter 406. As one example, when the DC-to-AC converter is configured as an H bridge, the processing device 428 may control the opening and closing of the switches in the H bridge.

A processing device 430 in the receiver device 412 can be operatively connected to the AC-to-DC converter 418 and/or the load 420. Although not shown in FIG. 4, the processing device 430 may be operatively connected to other components (e.g., sensor, memory) in the transmitter device. The processing device 430 may control or monitor the operation of the AC-to-DC converter 418 and/or the load 420. As one example, the processing device 430 may monitor the charge level on the load 420 when the load is configured as a rechargeable battery.

Communication circuitry 432, 434 may be operatively connected to the processing devices 428, 430 in the transmitter and receiver devices 402, 412, respectively. The communication circuitry 432, 434 can be used to establish a communication channel 436 between the transmitter and receiver devices. As described earlier, inductive energy transfer can be used for communication between the transmitter and receiver devices. The communication channel 436 is an additional communication mechanism that is separate from inductive energy transfer. The communication channel 436 is used to convey information from the transmitter device 402 to the receiver device 412, and vice versa. The communication channel 436 may be implemented as a physical or wired link, or as a wireless link. In one embodiment, the communication channel 436 is configured as any suitable digital communication channel that is used to transmit a digital signal (e.g., a digital bit stream) or packets between the transmitter and receiver devices.

Figure 5:
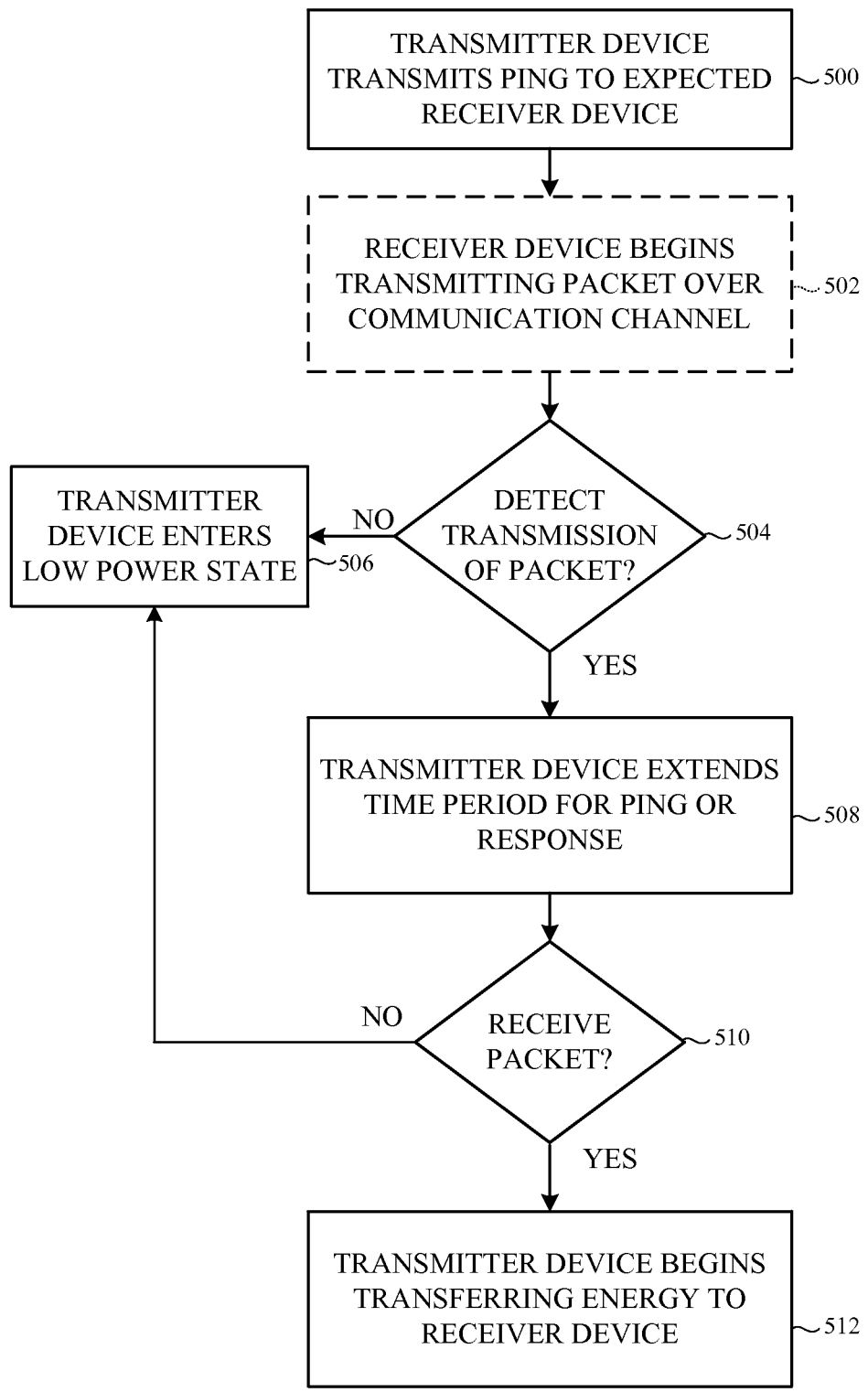
FIG. 5 shows a flowchart of a first method of operating the inductive energy transfer system 400 shown in FIG. 4.

FIG. 5 shows a flowchart of a first method of operating the inductive energy transfer system 400 shown in FIG. 4. As one example, the method of FIG. 5 can be used by a transmitter device to detect the presence or absence of a receiver device when the transmitter device is in a low power state, such as a sleep state. Additionally or alternatively, a transmitter device may perform the method of FIG. 5 to determine if a receiver device is ready to receive energy.

Initially, as shown in block 500, a transmitter device may transmit a ping to an expected receiver device. A "ping" is a short burst of energy that is generated by the transmitter coil in the transmitter device. A ping consumes less power because a ping is transmitted for a short period of time. If the receiver device is present, the receiver device may begin transmitting a digital signal or packet over a communication channel (e.g., channel 436 in FIG. 4) during and/or within a given time period after the ping is transmitted to the receiver device (block 502). The signal or packet can be part of a communication protocol. Thus, in some embodiments, the receiver device begins transmitting a preamble packet that is part of a communication protocol. Block 502 is shown in dashed lines because block 502 is not performed in situations where the receiver device is not present or mated with the transmitter device, or the receiver device is not able to receive or detect the transferred energy that forms the ping.

Next, as shown in block 504, a determination is made by the transmitter device as to whether or not it detects the transmission of a packet. For example, if the receiver device has started transmitting a preamble packet, a signal or signals on certain circuitry (e.g., capacitors) within the transmitter device may begin to toggle or change values. The transmitter device can detect the changing signal(s), and based on the changing signal(s), determine the receiver device is transmitting a packet (e.g., a preamble packet). If the transmitter device does not detect the transmission of a packet, the process passes to block 506 where the transmitter device enters a low power state (e.g., a sleep state). If the transmitter device detects the transmission of a packet at block 504, the method continues at block 508 where the transmitter device extends the time period to transmit the ping or the time to receive a response from the receiver device. The transmitter device may or may not continue to transfer energy during this extended time period.

The transmitter device then determines whether it received a complete packet from the receiver device (block 510). If the transmitter device did not receive a full packet, the process passes to block 506 where the transmitter device enters a low power state. If the transmitter device receives a complete packet from the receiver device, the method continues at block 512 where the transmitter device transfers energy inductively to the receiver device. As one non-limiting example, the transmitter device can increase the duty cycle of the energy transfer.

Figure 6:
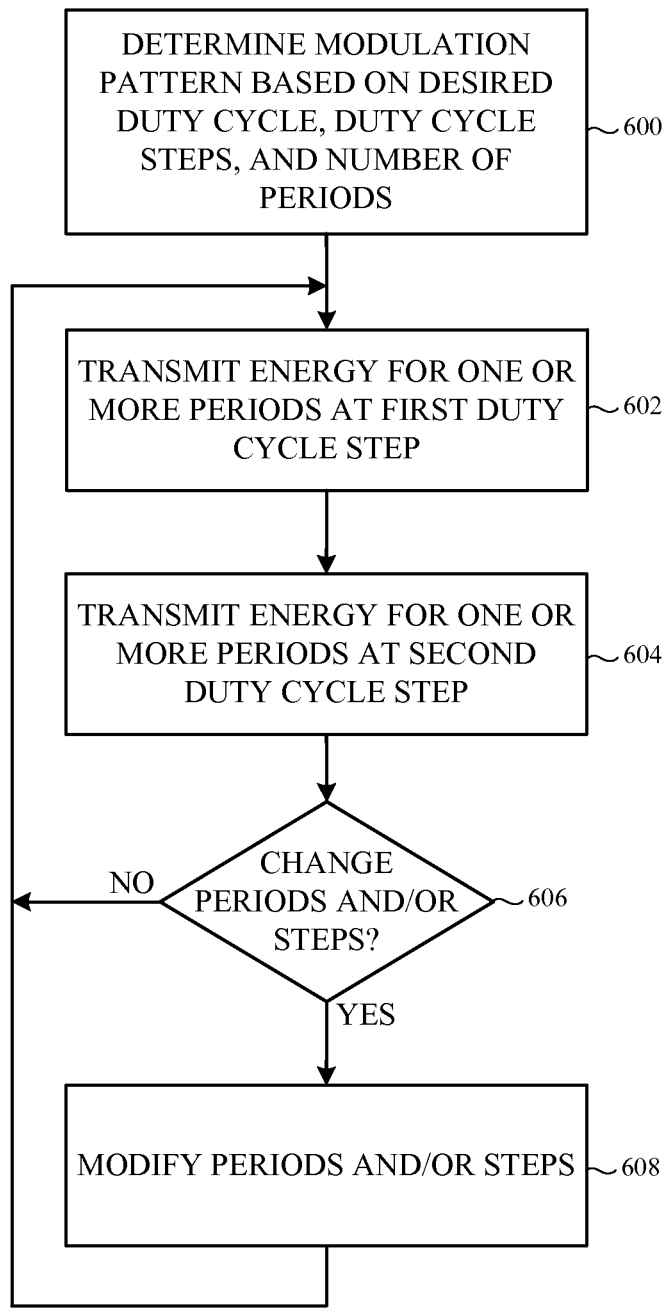
FIG. 6 shows a flowchart of a second method of operating the inductive energy transfer system 400 shown in FIG. 4.

FIG. 6 shows a flowchart of a second method of operating the inductive energy transfer system 400 shown in FIG. 4. The term "duty cycle" refers to the percentage or portion of time in a period that a signal is on or active. In other words, the duty cycle is the proportion of a signal's "on time" to one period of the signal. The duty cycle can range from zero (signal is always off) to 100% (signal is on constantly). Typically, a duty cycle is varied in discrete steps. The steps are a function of the resolution of the counter. For example, a duty cycle step may increase a duty cycle from a first step of 20% to a second step of 21%. The method of FIG. 6 averages multiple duty cycles over a number of periods. The method performs duty cycle dithering to change the duty cycle to a value that can be less than a step, such that the averaged duty cycle may be between two steps. As one non-limiting example, the method of FIG. 6 can be used to produce a duty cycle of 20.5% when the duty cycle can step from 20% to 21%.

Figure 7:
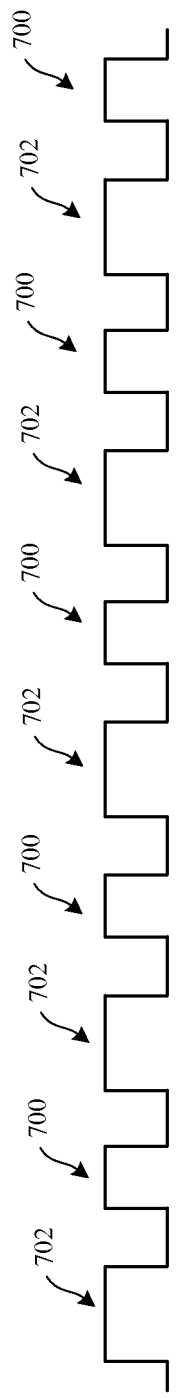
FIGS. 7 and 8 are example waveforms illustrating duty cycle modulation patterns that can be produced by the method shown in FIG. 6.

Initially, as shown in block 600, a duty cycle modulation pattern can be determined based on the desired duty cycle, the duty cycle steps, and the number of periods. For example, as described earlier, the desired duty cycle may be 20.5%, the duty cycle steps can be 20% and 21%, and the number of periods may be 10. The modulation pattern can be arranged to transmit energy inductively at alternating duty cycles of 20% and 21% over the 10 cycles to obtain an average duty cycle of 20.5%. This modulation pattern is shown in FIG. 7. Energy is transferred inductively at alternating duty cycles of 20% (see 700 in FIGS. 7) and 21% (see 702 in FIG. 7) for 10 periods (5 periods at 20% and 5 periods at 21%). The duty cycle steps of 20% and 21% can be interleaved to produce the desired averaged duty cycle.

Returning to block 602 in FIG. 6, energy is transferred for one or more periods at the first duty cycle step. Energy is then transferred for one or more periods at the second duty cycle step (block 604). A determination may be made at block 606 as to whether or not the number of periods and/or the duty cycle steps are to be changed. Changing the number of periods and/or the duty cycle steps adjusts the averaged duty cycle of the energy transfer. If the number of periods and/or the duty cycle steps will not be changed, the method returns to block 602. If the number of periods and/or the duty cycle steps will be changed, the number of periods and/or the duty cycle steps are changed at block 608. The determination as to whether the number of periods and/or the duty cycle steps are to be changed can occur every time energy is transferred inductively, at select occurrences of inductive energy transfer, or at select times during inductive energy transfer. The number of periods and/or the duty cycle steps may be changed based on the operating conditions of the transmitter device, the receiver device, or the inductive energy transfer system.

Figure 8:
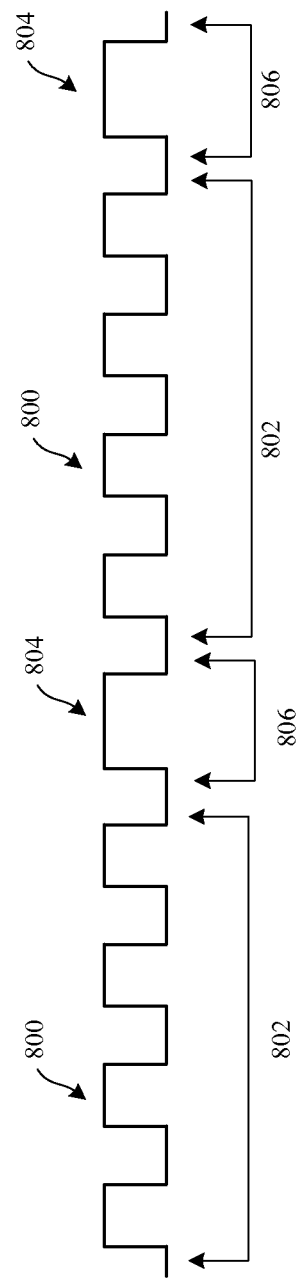

FIG. 8 shows an example waveform depicting another duty cycle modulation pattern that may be produced by the method shown in FIG. 6. Energy is transferred inductively at a first duty cycle step 800 for four periods (time interval 802). Energy is then transferred inductively at a second duty cycle step 804 for one period (time interval 806). It should be noted that other embodiments can use different modulation patterns than the patterns shown in FIGS. 7 and 8. In one non-limiting example, during a first time interval energy may be transferred inductively at a first duty cycle step for three periods, and during a second time interval energy can be transferred at a second duty cycle step for two periods. Additionally, other embodiments can include any given number of periods, more than two time intervals, and/or more than two duty cycle steps.

Figure 9:
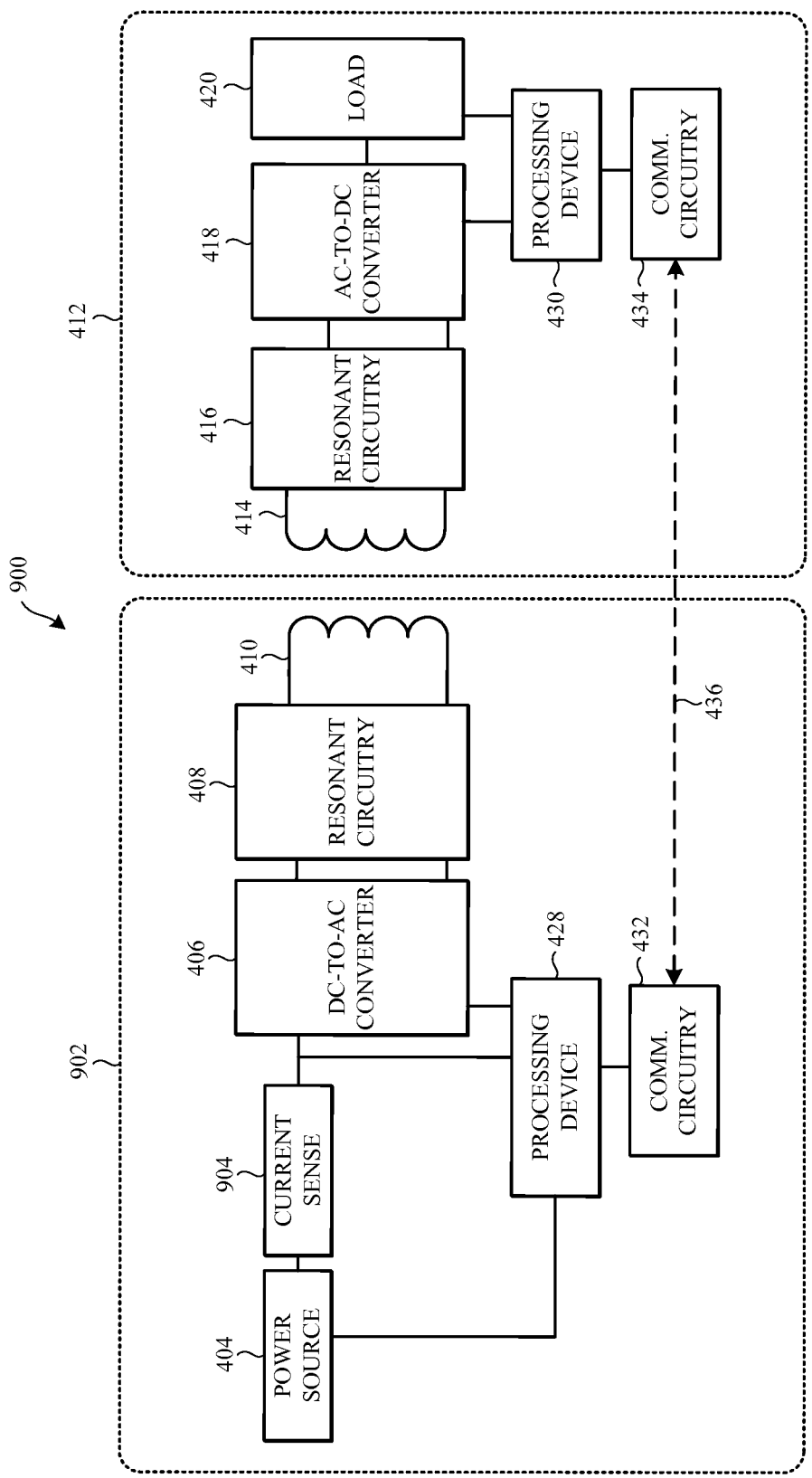
FIG. 9 shows a simplified schematic diagram of a second example of an inductive energy transfer system that is suitable for use as the inductive energy transfer system shown in FIGS. 1 and 2.

FIG. 9 shows a simplified schematic diagram of a second example of an inductive energy transfer system that is suitable for use as the inductive energy transfer system shown in FIGS. 1 and 2. The inductive energy transfer system 900 is similar to the system 400 shown in FIG. 4 except for the addition of the current sense circuit 904 in the transmitter device 902. The current sense circuit 904 includes circuitry that measures the current that is input into the DC-to-AC converter 406. Any suitable circuitry can be used to implement the current sense circuit 904. As one example, a current sense amplifier and resistor can be included in the current sense circuit 904.

As described earlier, the power source 404 for the transmitter device may be a wall outlet that is connected to the transmitter device with a cord (see 110 in FIG. 1). Additionally or alternatively, the power source may be another electronic device that is connected to the transmitter device by a connector, such as a USB connector. In some situations, it may be desirable to limit the amount of current the transmitter device is drawing from a power source such as a wall outlet or another electronic device. For example, the current can be limited to meet one or more energy standards.

Figure 10:
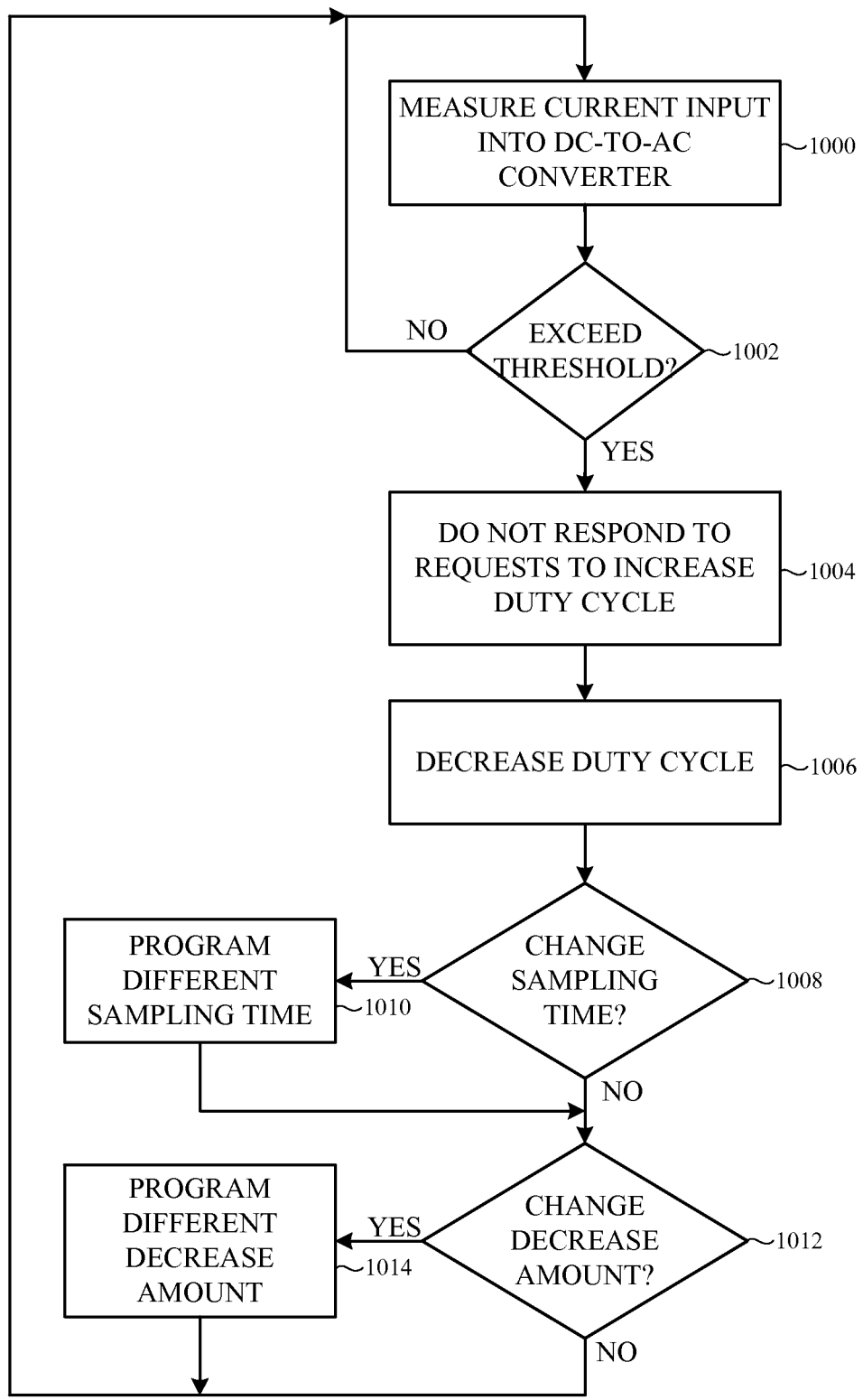
FIG. 10 shows a flowchart of a first method of operating the inductive energy transfer system 900 shown in FIG. 9.

FIG. 10 shows a flowchart of a method of operating the inductive energy transfer system 900 shown in FIG. 9. The current sense circuit 904 can measure the current input into the DC-to-AC converter 406 (block 1000). In one embodiment, the current sense circuit 904 can measure the current periodically. As one example, the current may be measured once per millisecond.

The processing device 428 can be adapted to receive the current measurements and compare the current measurements to a maximum value or threshold to determine if a current measurement equals or exceeds the threshold (block 1002). The process returns to block 1000 if the current measurements do not exceed the threshold. If the current measurement exceeds the threshold at block 1002, the method continues at block 1004 where the transmitter device does not respond to, or act on requests to increase the duty cycle as long as the current measurements exceed the threshold. As one example, the processing device 428 may be adapted to receive requests to increase the duty cycle. The processing device 428 may not cause the duty cycle to increase so long as the current measurements exceed the threshold.

The duty cycle may then be reduced by a given amount, as shown in block 1006. As one example, the processing device can modify the operation of the DC-to-AC converter (e.g., alter the timing of opening and closing switches) to decrease the duty cycle by the given amount. The given amount may be fixed, or the given amount can be adjustable or programmable. In one example embodiment, the duty cycle is decremented each time the current is measured and the current measurement exceeds the threshold. Other embodiments can decrease the duty cycle at different time intervals.

A determination may then be made at block 1008 as to whether or not the sampling time for the current measurements is to be changed. If so, the process passes to block 1010 where the sampling time is changed. If the sampling time is changed at block 1010, or if it is determined at block 1008 that the sampling time will not change, the method continues at block 1012 where a determination is made as to whether or not the amount the duty cycle is decreased is to be changed. If so, the process passes to block 1014 where the amount of decrease is changed. The method returns to block 1000 if the amount of decrease is changed at block 1014 or if it is determined at block 1012 that the amount of decrease will not change.

Thus, in some embodiments the sampling time and/or the amount of decrease in the duty cycle may be programmable and can be changed periodically or at select times based on one or more factors. The factors can include, but are not limited to, the operating conditions of the transmitter device and/or the magnitude of the difference between the current measurement and the threshold. Blocks 1008 and 1010 are optional and may be omitted in other embodiments. Additionally or alternatively, blocks 1012 and 1014 are optional and can be omitted in other embodiments.

Figure 11:
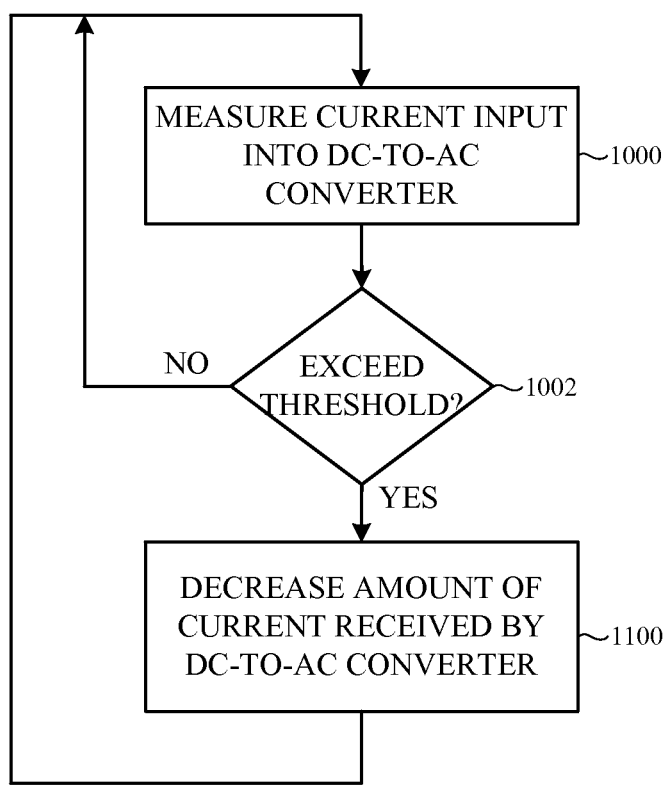
FIG. 11 shows a flowchart of a second method of operating the inductive energy transfer system 900 shown in FIG. 9.

The embodiment shown in FIG. 10 reduces the current level received by the DC-to-AC converter by decreasing the duty cycle of the signal applied to the transmitter coil. The current level that is input into the DC-to-AC converter can be adjusted differently in other embodiments (see FIG. 11). The current sense circuit 904 can measure the current input into the DC-to-AC converter 406 (block 1000). A determination may be made as to whether or not the current measurement equals or exceeds a threshold (block 1002). As described earlier, the processing device 428 can be configured to receive the current measurements and compare the current measurements to a maximum value or threshold to determine if a current measurement equals or exceeds the threshold. If the current measurement does not equal or exceed the threshold, the process returns to block 1000. If the current measurement exceeds the threshold at block 1002, the method continues at block 1100 where a current level that is input into the DC-to-AC converter is reduced by a given amount. For example, in one embodiment a voltage level that is received by the DC-to-AC converter is decreased by a given amount. Alternatively, the operating frequency of the DC-to-AC converted may be modified by a given amount. As one example, when the DC-to-AC converter is configured as an H bridge, the processing device 428 can modify the timing of the opening and closing of the switches in the H bridge.

Additionally, the method may include blocks that are similar to blocks 1008 and 1010 and/or to blocks 1012 and 1014 in FIG. 10. The process in FIG. 11 can include a determination as to whether the sampling time for the current measurements should change (block 1008). If so, the sampling time can be changed (see block 1010). Additionally or alternatively, the method of FIG. 11 can include a determination as to whether or not the modification amount in the voltage level or the operating frequency should change (see block 1012). If so, the amount of the modifications can be changed (see block 1014).

Figure 12:
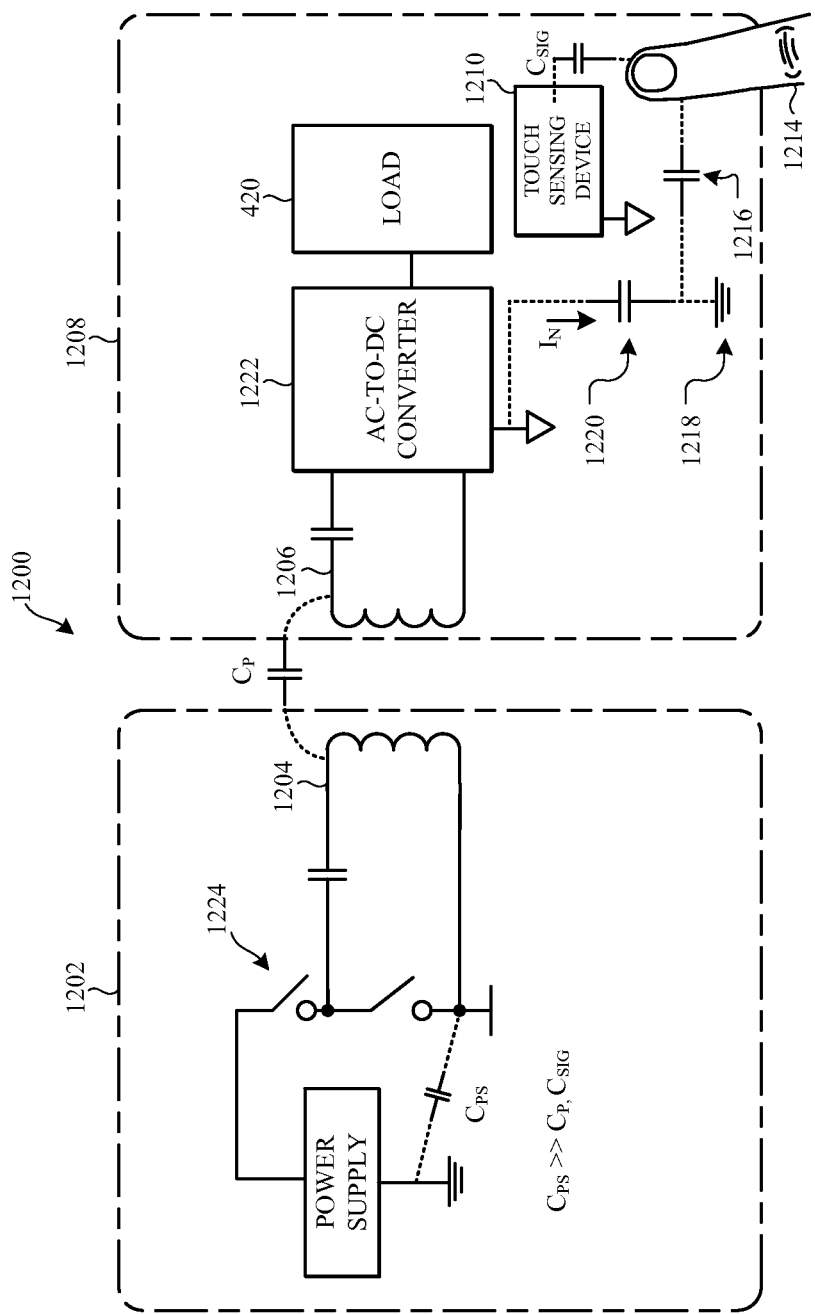
FIG. 12 shows a simplified schematic diagram of an inductive energy transfer system that includes a touch sensing device.

In some situations, the performance of other devices or functions in a receiver device can be impacted when the transmitter device is transferring energy inductively to the receiver device. As one example, a receiver device can include a touch sensing device in a display, in an input device such as a button, and/or in a portion of the housing. Inductive energy transfer can have a detrimental effect on the performance of the touch sensing device, as described in conjunction with FIG. 12. FIG. 12 shows a simplified schematic diagram of an inductive energy transfer system that includes a touch sensing device. The transmitter device 1202 includes a transmitter coil 1204 that couples inductively with a receiver coil 1206 in the receiver device 1208 to transfer energy from the transmitter device to the receiver device. At certain frequencies, noise produced by the transmitter device 1202 can adversely impact a touch sensing device 1210 in the receiver device 1208 when a user touches an input surface of the touch sensing device 1210 while the transmitter device is transferring energy to the receiver device. The noise can overwhelm the measurements obtained by the touch sensing device and make it difficult to discern a touch measurement from the noise. The noise can reduce or effectively destroy the resolution of the touch sensing device.

For example, in some embodiments the touch sensing device is a capacitive touch sensing device that detects touch through changes in capacitance measurements. When the user touches the input surface of the touch device (e.g., with a finger 1214), a parasitic capacitance (represented by capacitor 1216) exists between the finger and an earth ground 1218. A parasitic capacitance (represented by capacitor 1220) also exists between the AC-to-DC converter 1222 and the earth ground 1218. Common mode noise produced by the DC-to-AC converter 1224 (shown as a half bridge) in the transmitter device 1202 can couple to the receiver device 1208 through the parasitic capacitance CP. The common mode noise produces a noise signal IN that produces a varying voltage across the capacitor 1220. The touch by the finger 1214 is input with respect to the earth ground 1218, but the touch sensing device 1210 measures the capacitance CSIG with respect to a device ground. Effectively, the varying voltage across the capacitor 1220 interferes with the capacitive touch measurement and makes it difficult to discern the touch measurement from the noise.

Figure 13:
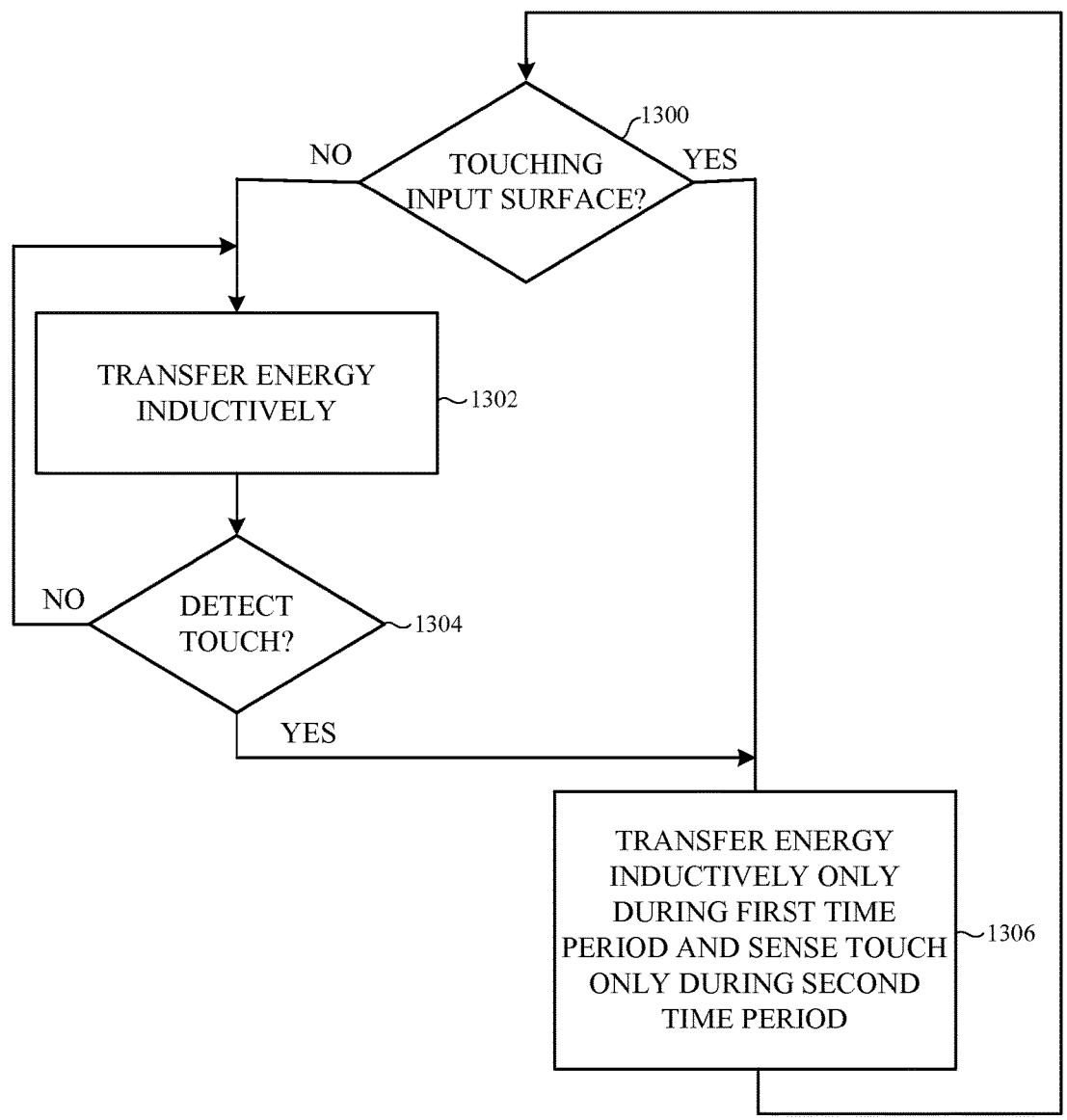
FIG. 13 shows a flowchart of a method of determining an operating mode for the inductive energy transfer system 1200 shown in FIG. 12.

FIG. 13 shows a flowchart of a method of determining an operating mode for the inductive energy transfer system 1200 shown in FIG. 12. The method can reduce or eliminate the impact inductive energy transfer has on the operation of the touch sensing device 1210. The method is performed while the receiver device is mated with the transmitter device (see e.g., FIG. 2) and the transmitter device is transferring energy inductively to the receiver device. Initially, a determination may be made as to whether or not a user is touching an input surface of the touch sensing device while the transmitter device is transferring energy inductively to the receiver device (block 1300). A user can be touching an input surface with his or her finger or with an object, such as a conductive stylus. If the user is not touching the input surface of the touch sensing device, the process passes to block 1302 where energy is transferred inductively from the transmitter device to the receiver device. As one example, the transmitter device can be transferring energy inductively to the receiver device to charge a battery in the receiver device.

A determination may then be made at block 1304 as to whether or not the touch sensing device detects a touch on the input surface of the touch sensing device. If not, the method returns to block 1302. If the touch sensing device detects a touch on the input surface of the touch sensing device, or it is determined at block 1300 that the user is touching the input surface of the touch sensing device (e.g., the input surface is a cover glass over a display and the user selects an icon displayed on the display), the process continues at block 1306 where energy is transferred inductively to the receiver device only during a first time period and the touch sensing device senses touch only during a different second time period. Essentially, inductive energy transfer is periodically turned off to allow the touch sensing device to sense touch samples while the inductive energy transfer is turned off.

Figure 14:
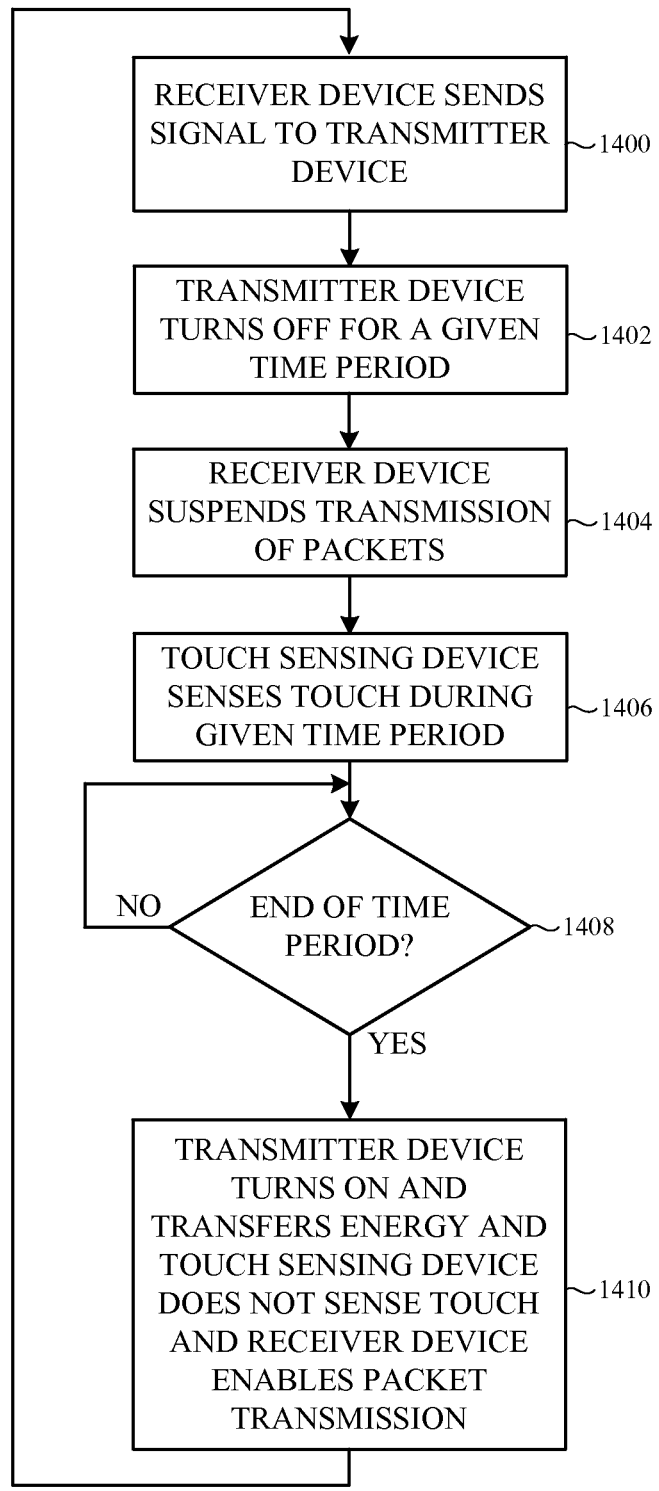
FIG. 14 shows a flowchart of one example method of performing block 1306 in FIG. 13.

FIG. 14 shows a flowchart of one example method of performing block 1306 in FIG. 13. The receiver device can send a signal to the transmitter device at block 1400. The receiver device can transmit the signal by altering a setting or parameter in the receiver device that modifies the inductive energy transfer, or the receiver device may transmit the signal via a separate communication channel (see 436 in FIG. 4). The signal instructs the transmitter device to turn off for a given period of time (block 1402). As one example, a processing device in the transmitter device can cause the transmitter device to turn off based on the signal received from the receiver device. While the transmitter device is turned off, the receiver device may suspend the transmission of packets or signals on the separate communication channel at block 1404. Additionally or alternatively, the touch sensing device obtains one or more touch samples at block 1406.

A determination may then be made at block 1408 as to whether or not the given time period in which the transmitter is turned off has ended. If not, the process waits at block 1408. When the given time period in which the transmitter is turned off ends, the method passes to block 1410 where the transmitter device turns on and transfers energy to the receiver device. The touch sensing device does not obtain touch samples once the transmitter device begins transferring energy to the receiver device. If the receiver device suspended packet transmission at block 1404, the receiver device can also enable packet transmission at block 1410.

Various embodiments have been described in detail with particular reference to certain features thereof, but it will be understood that variations and modifications can be effected within the spirit and scope of the disclosure. For example, the methods shown in FIGS. 5, 6, 10, 13, and 14 may each be performed differently in other embodiments. A method can include additional blocks, omit blocks, and/or perform the blocks in a different order. As one example, the method shown in FIG. 6 can include more than two duty cycle steps. Additionally or alternatively, blocks 606 and 608 may be omitted in some embodiments.

Even though specific embodiments have been described herein, it should be noted that the application is not limited to these embodiments. In particular, any features described with respect to one embodiment may also be used in other embodiments, where compatible. Likewise, the features of the different embodiments may be exchanged, where compatible.

What is claimed is:

1. A method for operating an inductive energy transfer system that includes a transmitter device and a receiver device, the receiver device including a touch sensing device, the method comprising:
   detecting if an input surface of the touch sensing device is touched while the transmitter device is transferring energy inductively to the receiver device; and
   if the input surface is touched, the transmitter device transferring energy inductively only during a first time period and the touch sensing device obtaining touch samples only during a different second time period.

2. The method as in claim 1, further comprising determining if the input surface is being touched prior to the transmitter device transferring energy inductively to the receiver device.

3. The method as in claim 1, further comprising transferring energy inductively if a touch is not detected on the input surface of the touch sensing device.

4. The method as in claim 1, wherein the input surface of the touch sensing device comprises a cover glass disposed over a display.

5. The method as in claim 4, wherein the receiver device comprises a wearable communication device.

6. A method for operating an inductive energy transfer system that includes a transmitter device and a receiver device, the receiver device including a touch sensing device, the method comprising:
   detecting if an input surface of the touch sensing device is touched while the transmitter device is transferring energy inductively to the receiver device;
   if the input surface is touched, the receiver device transmitting a signal to the transmitter device;
   the transmitter device turning off for a given period of time based on the signal received from the receiver device;
   the touch sensing device obtaining touch samples while the transmitter device is turned off; and
   after the given time period, the transmitter device turning on and transferring energy inductively to the receiver device.

7. The method as in claim 6, further comprising the receiver device suspending signal transmission to the transmitter device during the time period the transmitter device is turned off.

8. The method as in claim 6, wherein the input surface of the touch sensing device comprises a cover glass disposed over a display.

9. The method as in claim 8, wherein the receiver device comprises a wearable communication device.

10. A method for operating a capacitive sensing device with an inductive power receiver, the method comprising:
    detecting an input to the capacitive sensing device; and
    in response to detecting the input, receiving energy at the receiver device only during a first time period; and
    further in response to detecting the input, operating the capacitive sensing device only during a second time period that is different from the first time period.

11. The method of claim 10, if the input is detected, the receiver device sending a signal to a transmitter device to transfer energy only during the first time period.

12. The method of claim 10, if the input is not detected, the receiver device receiving energy during both the first time period and the second time period.

13. The method of claim 10, wherein the capacitive sensing device comprises one of a touch sensor, an image sensor, or a biometric sensor.

14. The method of claim 10, further comprising determining whether the capacitive sensing device is mated with a transmitter device.

15. The method of claim 14, wherein the operation of determining that the capacitive sensing device is mated with the transmitter device occurs prior to determining if the capacitive sensing device detects the input.

16. The method of claim 10, wherein the input comprises a touch input.

17. The method of claim 10, wherein the input comprises a stylus input.

18. A method for operating a capacitive sensing receiver device with an inductive power transmitter, the method comprising:

detecting an input to the capacitive sensing device; and
in response to detecting the input, sending a signal to the inductive power transmitter to transfer energy only during a first time period; and
further in response to detecting the input, operating the capacitive sensing device only during a second time period that is different from the first time period.

* * * * *